July 28, 1964  W. HOFMANN ETAL  3,142,238
CAMERA OPERATING STRUCTURE
Filed Sept. 10, 1962
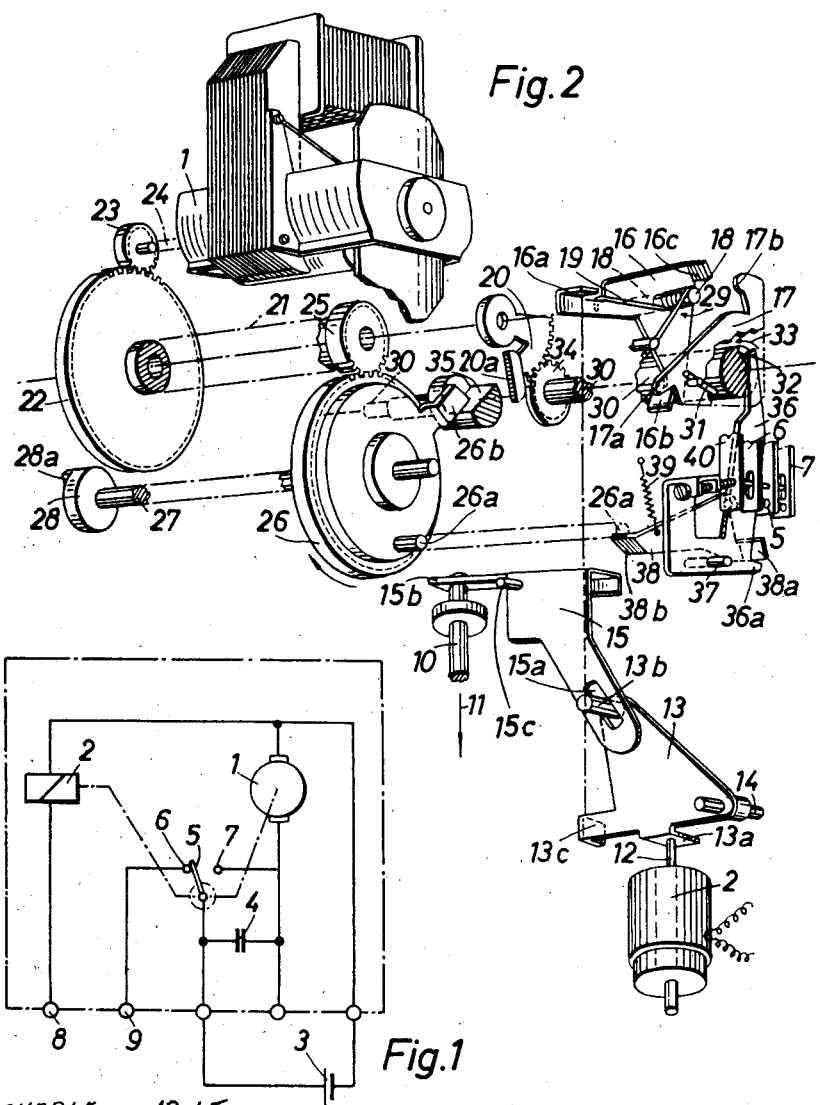
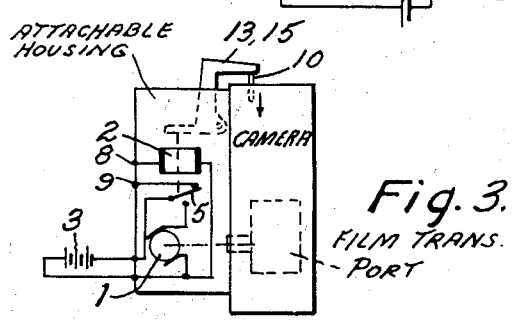
INVENTORS
WILFRIED HOFMANN
JOSEF PFEIFER
HANS BIERMEIER
BY Michael S. Striker
Atty.

United States Patent Office 3,142,238
Patented July 28, 1964

3,142,238
CAMERA OPERATING STRUCTURE
Wilfried Hofmann and Josef Pfeifer, Munich, and Hans Biermeier, Munich-Laim, Germany, assignors to Agfa Aktiengesellschaft, Leverkusen, Germany
Filed Sept. 10, 1962, Ser. No. 222,306
Claims priority, application Germany Sept. 16, 1961
4 Claims. (Cl. 95—31)

The present invention relates to cameras.

More particularly, the present invention relates to cameras used in research, in industry, by law enforcement agencies in the regulation of traffic, for example, wherein a series of photographs will be automatically made in response to the occurrence of given conditions. For example, such cameras are adapted to be carried by a vehicle and will automatically make a photograph whenever a certain line is crossed. Also, such cameras are used during the performance of certain processes to photograph succeeding stages of the process whenever certain phases of the process occur.

Although cameras capable of operating in the manner referred to above are well known, they suffer from a major drawback. Thus, it sometimes happens that the conditions for automatically operating the camera to make an exposure occur so soon after the camera was previously set into operation to make an exposure that the structure for automatically operating the camera tries to actuate the parts for making an exposure while these parts are already in operation. Naturally, a second exposure cannot be made under these circumstances, and since such cameras are customarily provided with double-exposure preventing devices the exposure which is being made will not be undesirably influenced. However, with the known structures under the above conditions the shutter-tripping plunger is actuated and the double-exposure preventing structure is called into play, so that these parts are undesirably stressed, and it sometimes happens that the attempt to make an exposure while the camera is carrying out operations involved in the making of a previous exposure injures the camera and necessitates repair thereof. As is well known, in the making of an exposure it is not only necessary to actuate the shutter so as to expose the film, but in addition it is necessary to advance the next film frame into position to be exposed, and depending upon the type of camera, it may also be necessary to cock the shutter and the attempt to initiate the operations for another exposure while these latter operations, such as advancing the film, are taking place, often results in damage to the camera. Furthermore, the actuation of the shutter-tripping plunger and the double-exposure preventing structure provides undesirable vibrations which may have an undesirable influence on the exposure which is being made.

It is accordingly a primary object of the present invention to provide for a camera of the above type a structure which will reliably prevent an exposure from being made until all of the operations in connection with the previous exposure have been completed.

Another object of the present invention is to provide a structure which is capable of operating in this way in a fully automatic manner.

Still another object of the present invention is to provide a structure of the above type which operates electrically and which is capable of reliably maintaining all of the camera components which operate in connection with the making of an exposure operating in a normal way in the proper sequence even though during these operations conditions should arise which would otherwise initiate an exposure.

An additional object of the present invention is to provide a structure which can be assembled into a housing which can be conveniently attached to a conventional camera to operate the latter so that it will automatically make exposures whenever a given set of conditions arise while also preventing operation of the structure which will initiate an exposure during the time that operations in connection with a previous exposure are going forward.

The objects of the present invention also include the provision of simple mechanical elements capable of reliably controlling electric structure in a fully automatic manner to operate as referred to above.

With the above objects in view the invention includes, in a camera assembly, a solenoid which is adapted to actuate the shutter of the camera when given conditions are encountered. A motor is provided for driving the film-advancing structure and for cocking the shutter, if necessary. The solenoid is located in an electrical circuit one part of which is closed when the predetermined conditions for automatically making the exposure are encountered. A second part of the solenoid circuit is opened and closed by an alternating switch means of the invention. The motor is located in a motor circuit which is also opened and closed by the alternating switch means of the invention and the arrangement is such that when the alternating switch means closes the motor circuit it necessarily opens the solenoid circuit and when it closes that part of the solenoid circuit to which it is connected, it necessarily opens the motor circuit. As a result, whenever the motor is energized, even if part of the solenoid circuit should be closed by the occurrence of conditions which would normally initiate the making of an exposure another part of the solenoid circuit will be maintained open by the alternating switch means of the invention so that the solenoid cannot become energized and thus the shutter-actuating plunger and the double-exposure preventing structure of the camera are not moved, are not stressed, and will not produce undesirable vibrations.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings, in which:

FIG. 1 is a simplified schematic diagram of the electrical connections of the invention; and FIG. 2 is a fragmentary, exploded, perspective illustration of one possible embodiment of a structure according to the present invention; and FIG. 3 illustrates diagrammatically a mode of assembling a structure according to the invention with a conventional camera.

The invention relates to a unit capable of being attached to a camera for actuating the latter for making an exposure, and for also actuating in certain cases structure which will automatically set the camera according to the lighting conditions, whenever a certain signal is detected, as, for example, travelling of the vehicle over a certain line, the unit of the invention also serving immediately after actuation of the shutter to making an exposure, to advance the film and to cock the shutter, if such shutter-cocking is necessary. This unit of the invention serves to prevent the camera from being unnecessarily stressed, as for example when a second signal is detected while operations are still going forward in response to detection of a first signal, which is to say before transportation to the next film frame into the exposure-position has been completed and before the shutter has again been cocked, if the camera is of the type where the camera requires cocking. With the electrical and mechanical structure of the unit of the invention if such a second signal is detected before operations in connection with a first signal have been completed, no transfer of the signal to the camera shutter can take place.

Referring to FIG. 1 where a schematic highly simplified wiring diagram is shown for the sake of clarity, it will be seen that the structure includes an electric motor 1 for transporting the film and/or cocking the shutter. Also, the structure includes a solenoid 2 for actuating the camera shutter, a battery 3 for supplying energy for the motor 1 and the solenoid 2, a condenser 4 and a pair of contacts 6, 7 and a movable switch member 5 all of which together constitute an alternating switch means. In addition, the circuit includes a signal-detecting means shown in FIG. 1 as a pair of spaced contacts 8 and 9 which are adapted to be bridged so as to be placed in electrical connection with each other. For example, a vehicle may carry electrically-conductive brushes or the like, which will be connected electrically to each other by engaging a given electrically conductive line over which the vehicle passes, such arrangements being used for the regulation of traffic. However, the electrical connection between the contacts 8 and 9 can be provided through other known devices in connection with other mechanical, electrical, physical, or chemical processes where it is desired to make a series of photographs upon the occurrence of given conditions. It will be noted that the spaced contacts 8 and 9 are located in the circuit of the solenoid 2 and form a means for closing part of this circuit upon the occurrence of given conditions. When the solenoid 2 is energized it will, in a manner described below, actuate the shutter-operating plunger 10 of the camera, this plunger being shown in FIG. 2. Thereupon, with a mechanical structure one embodiment of which is described below the switch member 5 is moved from the contact 6 of the alternating switch means 5–7 of the invention into engagement with the contact 7 thereof so that after the shutter has been actuated the circuit of the electric motor 1 is completed and the latter will be supplied with energy from the battery so that the motor 1 becomes energized and will drive structure for transporting the film, and if necessary, for cocking the shutter. The structure of the present invention returns the switch member 5 away from the contact 7 back into engagement with the contact 6 only when film transportation has been completed. Inasmuch as the solenoid circuit is open during operation of the motor 1, even if a signal is received at this time across the contacts 8 and 9, the solenoid 2 will not be energized so that the plunger 10 and a known double-exposure preventing structure will not be influenced, and in this way the plunger 10 and the double-exposure preventing structure are protected against injury. The same applies when, for example, the end of the film strip is reached and the film cannot be advanced by a distance equal to a film frame, the motor 1 being deenergized at this time by a known safety device.

FIG. 2 illustrates only the shutter-actuating plunger 10 of a known still camera which is adapted to be provided with the unit of the invention. When the plunger 10 is moved in the direction of the arrow 11 of FIG. 2, the shutter of the camera will be actuated to make an exposure. If the camera is of the type where the shutter is previously cocked, then actuation of the plunger 10 serves only to trip the shutter in order to make the exposure. However, the invention is also applicable to that type of camera where the initial increment of movement of the plunger 10 cocks the shutter and the final increment of movement thereof releases the cocked shutter to make the exposure. With this latter type of camera the motor 1 is used only to transport the film, while with the former type of camera the motor 1 will be used to transport the film as well as to cock the shutter. For example, many known still cameras have a single lever which is actuated after each exposure to advance the film and cock the shutter, and the motor 1 may be used to operate such a lever of a conventional camera.

The solenoid 2 which together with the remaining structure described below is located in a housing which in FIG. 2 is not illustrated for the sake of clarity but shown in FIG. 3, and which can be attached to the camera as illustrated, includes an armature 12 which moves longitudinally upon energizing and deenergizing of the solenoid 2. When the solenoid 2 is energized, the armature 12 thereof moves in a direction opposite to that indicated by the arrow 11. During this movement of the armature 12 it engages and moves a lug 13a of a lever 13 which is supported for turning movement by a stationary pivot pin 14 and which is connected by a pin-and-slot connection 13b, 15a to a lever 15 which is supported for turning movement by a stationary pin 15c and which has a lug 15b located over the plunger 10 so that the upward turning of the lever 13 in response to upward movement of the armature 12, as viewed in FIG. 2, produces a counterclockwise turning of the lever 15 with a consequent downward movement of its lug 15b so as to move the plunger 10 in the direction of the arrow 11 and thus actuate the shutter of the camera. The levers 13 and 15 thus form a first lever means for transmitting movement of the solenoid armature to the shutter-actuating plunger.

The movable switch member 5 is positioned between the contacts 6 and 7 for movement therebetween in the manner shown in FIG. 2, and a second lever means 17, 36 cooperates with the switch member 5 to control the alternating switch means in a manner described below. This second lever means 17, 36 is composed of a pair of levers 17 and 36, and a third lever means 16 controls the lever 17 of the second lever means in response to movement of the lever 13 of the first lever means in a manner described below. For this purpose a lug 16a of the lever 16 is located directly over and is engaged by a lug 13c of the lever 13.

The lever 16 is supported for free turning movement on an elongated shaft 18 which is stationary, and a spring 19 engages the lever 16 in the manner shown in FIG. 2 so as to urge the latter to turn in a counter clockwise direction, opposite to that indicated by the arrow 29. This spring 19 urges the lever 16 to its rest position where the lug 16a engages the lug 13c. Also freely turnable on the shaft 18 is a gear sector 20 and a sleeve 21. The rotary sleeve 21 fixedly carries a gear 22 which meshes with a pinion 23 fixed to the rotary shaft 24 of the electric motor 1. The sleeve 21 also fixedly carries a pinion 25 which meshes with a gear 26 which is fixed to a rotary shaft 27 which fixedly carries a drive member 28 for driving the film-advancing structure of the camera. The location of the lug 16a over the lug 13c results in turning of the lever 16 in the direction of the arrow 29 and tensioning of the spring 19 when the lever 13 is turned by the armature 12 upon energizing of the solenoid 2. A spring 31, which is only fragmentarily illustrated, acts on the lever 17 to urge the latter to turn in the direction of the arrow 33, and the result is that a projection 17a of the lever 17 is maintained in engagement with a lug 16b of the lever 16, this lug 16b engaging the underside of the projection 17a when the parts are at rest. The turning of the lever 16 in the direction of the arrow 29 causes its lug 16b to ride along the underside of the projection 17a turning the lever 17 in a direction opposite to that indicated by the arrow 33 in opposition to the spring 31, until the lug 16b rides off the tip of the projection 17a whereupon the spring 31 seeks to snap the lever 17 around in the direction of the arrow 33. However, before the lug 16b leaves the projection 17a, a lug 16c of the lever 16 becomes located in front of another projection 17b of the lever 17 so that the spring 31 only holds the projection 17b in engagement with the lug 16c after the lug 16b moves out of engagement with the projection 17a in response to upward movement of the lug 13c. The lever 17 is fixedly carried by a shaft 30 which is supported by suitable bearings for rotation about its axis and which has various portions of different diameters, this shaft 30 being fragmentarily illustrated. Thus, the spring 31 by acting on the lever 17 seeks also to turn the shaft 30 in the direction of the arrow 33, and at its right hand, as viewed in FIG. 2, the shaft 30 is provided with an integral cam 32 which cooperates with the lever 36. Thus, when the lever 16 has been turned in the direction of the arrow 29, the spring 31 can turn the lever 17 only until its projection 17b engages the lug 16c.

When the electrical connection between the space contacts 8 and 9 terminates, the shutter of the camera has already been actuated and the exposure has been made. The subsequent deenergizing of the solenoid 2 results in return of its armature 12 to its starting position, and the spring 19 can now expand, returning the lever 16 to its starting position and acting through the lever 16 on the lever 13 to return the latter also to its starting position, and of course the lever 13 acts on the lever 15 at this time to raise the lug 15b so that the plunger 10 will move in a direction opposite to that indicated by the arrow 11 back to its starting position also. The lever 16 at this time turns in a direction opposite to that indicated by the arrow 29, so that the lug 16c moves out of engagement with the projection 17b, and the spring 31 can now continue the turning of the lever 17 in the direction of the arrow 33, and of course the shaft 30 also turns in this direction at this time. This turning of the shaft 30 causes its cam 32 to turn the lever 36 in a clockwise direction about the pivot 37, as viewed in FIG. 2, this pivot 37 being a stationary pin which supports the lever 36 for turning movement. The switch member 5 is in the form of a spring member which due to its inherent resiliency seeks to move into engagement with the contact 6 but the lever 36 at this time acts on the switch member 5 to move it away from the contact 6 into engagement with the contact 7 so that the motor 1 becomes energized and starts to operate. The shaft 30 fixedly carries a gear sector 34 which meshes with gear sector 20, so that the turning of the shaft 30 in the direction of the arrow 33 will at this time turn the gear sector 20 in a clockwise direction, as viewed in FIG. 2, and this turning of the gear sector 20 will locate the plate 20a fixedly carried thereby in the path of turning of a pin 26a which is fixed to the gear 26 for rotary movement therewith. The shaft 30 is also provided with a control surface 35 which at this time turns out of the path of movement of a projection 26b of the gear 26. Therefore, when the shaft 30 turns in the direction of the arrow 33 to displace the lever 36 and thus move the switch member 5 into engagement with the contact 7, the surface 35 will be turned so as to free the gear 26 for rotary movement by the time the contact 7 is engaged by the switch member 5 and thus the motor 1 is free to operate when the motor circuit is closed. Through the transmission 23, 22, 25, 26, the unillustrated film-transporting structure is operated in an unillustrated manner well known in the art, for example, by turning of the known film-transporting structure of the camera, this latter structure being turned by the cam 28a of the drive member 28. The structure of the invention also includes a means for releasably holding the switch member 5 in engagement with the contact 7 until the motor 1 has operated to an extent sufficient to advance the film by a distance equal to the width of a film frame, and this releasable holding means includes a lever 38 which has a lug 38b engaged by the pin 26a in the rest position of the parts. A spring 39 seeks to turn the lever 38 in a clockwise direction, as viewed in FIG. 2, so as to move its lug 38a over the projection 36a of the lever 36 to prevent the latter from returning to the position where the switch member 5 will move away from the contact 7. The turning of the gear 26 during the initial operation of the motor 1 displaces the pin 26a away from the lug 38b so that the spring 39 will at this time place the releasable holding lever 38 in its holding position where the lug 38a prevents return of the lever 36 to its starting position. A leaf spring 40 acts on a screw carried by the lever 36 to urge the latter back to its starting position, and even though the shaft 30 returns to a position where the cam 32 will permit return movement of the lever 36 to its starting position, the lever 36 will not return until the locking lever 38 returns to its starting position in opposition to the spring 39. In this way the motor 1 will remain energized even when the cam 32 returns to its starting position.

After a predetermined extent of operation of the motor, the gear 26 will have turned through such an angle that its pin 26a engages the plate 20a and turns the gear sector 20 in a counter clockwise direction, as viewed in FIG. 2, with the result that the gear 34 and the shaft 30 turn in a clockwise direction, opposite to that indicated by the arrow 33. The lever 17 of course turns with the shaft 30, and at this time the upper edge of its projection 17a rides along the underside of the lever 16 turning the latter in opposition to the spring 19 until the lug 16b snaps beneath the projection 17a and the spring 31 now returns the lever 17 to its starting position shown in FIG. 2, and of course the cam 32 will have released the lever 36 for return to its starting position, but the lever 38 holds the lever 36 in the position where the motor 1 is maintained energized, as described above. Also, it will be noted that the surface 35 has returned to the position where it is located in the path of turning of the projection 26b.

At the end of the transportation of the film, when the gear 26 has turned through precisely one revolution, the projection 26b engages the surface 35 and the pin 26a engages the lug 38b so as to turn the lever 38 in opposition to the spring 39 to its released position releasing the lever 36 to the leaf spring 40 which turns the lever 36 until it again engages the cam 32 so that the springy switch member 5 due to its own resiliency moves away from the contact 7 and into engagement with the contact 6, and thus the rest position of the parts shown in FIGS. 1 and 2 again obtains and another exposure will be made as soon as the given conditions are detected by the contacts 8 and 9.

The above-described assembly of the invention can be mounted on all cameras which have a shutter-release member and a film-transporting structure as shown in FIG. 3. The structure of the invention can also be directly built into a camera and with such an arrangement the film-transporting elements will be directly connected to the drive member 28. Furthermore, a rotary shutter-actuating member can replace the longitudinally movable member 10, and the turning of such a shutter-actuating member can be brought about directly from the lever 13 so that the lever 15 could be eliminated. Moreover, with the structure of the invention it is possible for the operator to actuate the plunger 10 manually by pressing on the lug 15b whenever it is desired to make a photograph without electrical connection between the contacts 8 and 9, as for example, between a pair of successive signals. In this case also the motor-driven transporting structure will be actuated from the lug 13c and the levers 16 and 17 in the manner described above. Of course, the particular configuration of the elements of the invention can be different from those shown in the drawing and described above. For example, further step down transmission stages may be arranged between the shafts 21 and 27, so that the shaft 24 will turn through a greater number of revolutions during the transportation of the film. Also, the armature 12 and lug 13a can be fixed to each other instead of being pressed against each other by the spring 19. Moreover, a conventional coil spring may replace either the wire spring 19 or the leaf spring 40.

While the invention has been illustrated and described as embodied in automatic cameras, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be secured by Letters Patent is:

1. In a camera assembly, in combination, shutter-actuating means for actuating the shutter of the camera to make an exposure; a solenoid having an armature; first lever means transmitting movement of said armature when the solenoid is energized to said shutter-actuating means to move the latter for actuating the camera shutter when said solenoid is energized; a solenoid circuit for energizing said solenoid when said circuit is closed, said circuit including means for closing a first part of said circuit under given conditions; an electric motor adapted to drive film-advancing structure of the camera; a motor circuit for energizing the electric motor when said motor circuit is closed; alternating switch means having a rest position closing a second part of said solenoid circuit so that the solenoid will be energized upon closing of said first part thereof, said alternating switch means closing said motor circuit while simultaneously opening said solenoid circuit and opening said motor circuit while simultaneously closing said solenoid circuit at said second part thereof; second lever means cooperating with said alternating switch means for moving the same from said rest position to said position closing said motor circuit; spring means acting on said second lever means for urging the latter to move in a direction displacing said alternating switch means from said rest position to said position closing said motor circuit; and third lever means having a rest position maintaining said second lever means in opposition to said spring means in a position where said alternating switch means remains in said rest position thereof, said first lever means actuating said third lever means to release said second lever means to said spring means upon opening of said first part of said solenoid circuit and consequent deenergizing of said solenoid.

2. In a camera assembly as recited in claim 1, transmission means driven by said motor and operatively connected to said second lever means for turning the latter in opposition to said spring means to the initial position of said second lever means where it is held by said third lever means until the latter is again actuated by said first lever means.

3. In a camera assembly as recited in claim 2, said second lever means including a pair of levers one of which is directly acted upon by said transmission means and the other of which cooperates directly with said alternating switch means, and releasable locking lever means also actuated by said transmission means and cooperating with said other lever of said second lever means for releasably locking said other lever in a position maintaining said alternating switch means in said position closing said motor circuit until the motor has operated to advance the film through a given distance.

4. In a camera assembly, in combination, an electric motor adapted to drive film-advancing structure of the camera; a solenoid adapted to actuate the shutter of the camera, so as to make an exposure, when the solenoid is energized; a solenoid circuit for energizing the solenoid, said solenoid circuit including means for completing part of said solenoid circuit under given conditions; a motor circuit for energizing the electric motor when said motor circuit is closed; alternating switch means electrically connected with both of said circuits for closing part of the solenoid circuit while simultaneously opening the motor circuit and for closing the motor circuit while simultaneously opening the solenoid circuit, said alternating switch means having a rest position closing part of said solenoid circuit and opening said motor circuit; and mechanical transmission means actuated by said solenoid and said motor for moving said alternating switch means from said rest position thereof to said position closing said motor circuit after the solenoid has been energized to make an exposure and to return said switch means to said rest position thereof opening said motor circuit after the film has been advanced, said circuits, said solenoid, said motor, said switch means and said mechanical transmission means forming an operative arrangement, and including a housing containing said arrangement and being adapted to be attached to a camera and part of said mechanical transmission means which is actuated by said solenoid being positioned to actuate the shutter-tripping structure of the camera and another part of the mechanical transmission means which is actuated by the motor being positioned to actuate the film-advancing structure of the camera.

References Cited in the file of this patent

UNITED STATES PATENTS

| | | |
|---|---|---|
| 2,927,790 | Taylor et al. | Mar. 8, 1960 |
| 2,987,976 | Martin | June 13, 1961 |
| 3,007,385 | Fukuoka | Nov. 7, 1961 |